(12) United States Patent
Wang

(10) Patent No.: US 10,604,993 B2
(45) Date of Patent: Mar. 31, 2020

(54) ENERGY SAVING SECURITY COMPOSITE WINDOW

(71) Applicants: Shuquan Wang, Dongying (CN); Ruijing Wang, Burnaby, BC (CA); Ruixin Wang, Vancouver, BC (CA)

(72) Inventor: Shuquan Wang, Shandong (CN)

(73) Assignees: Shuquan Wang, Dongying (CN); Ruijing Wang, Burnaby, BC (CA); Ruixin Wang, Vancouver, BC (CA)

( * ) Notice: Subject to any disclaimer, the term of this patent is extended or adjusted under 35 U.S.C. 154(b) by 0 days.

(21) Appl. No.: 16/169,016

(22) Filed: Oct. 24, 2018

(65) Prior Publication Data
US 2019/0162012 A1 May 30, 2019

(30) Foreign Application Priority Data
Nov. 24, 2017 (CN) .......................... 2017 2 1592267

(51) Int. Cl.
*E06B 3/663* (2006.01)
*E06B 3/263* (2006.01)
*E06B 3/22* (2006.01)
*E06B 3/30* (2006.01)
*E06B 5/20* (2006.01)
(Continued)

(52) U.S. Cl.
CPC .......... *E06B 3/66333* (2013.01); *E06B 3/221* (2013.01); *E06B 3/26343* (2013.01); *E06B 3/26345* (2013.01); *E06B 3/305* (2013.01); *E06B 3/306* (2013.01); *E06B 3/66366* (2013.01); *E06B 5/11* (2013.01); *E06B 5/12* (2013.01); *E06B 5/20* (2013.01); *E06B 2003/66338* (2013.01)

(58) Field of Classification Search
CPC .. E06B 3/66333; E06B 3/221; E06B 3/26345; E06B 3/66366; E06B 2003/66338; E06G 5/20
USPC ....................................................... 52/786.1
See application file for complete search history.

(56) References Cited

U.S. PATENT DOCUMENTS 3,348,349 A * 10/1967 Petersen ................. E06B 3/305
52/775
3,703,063 A * 11/1972 Budich ................... E06B 3/222
52/213
(Continued)

*Primary Examiner* — Paola Agudelo
(74) *Attorney, Agent, or Firm* — Enshan Hong; VLP Law Group LLP

(57) ABSTRACT

An energy-saving security composite window comprising a peripheral side frame and glass installed on the side frame, in which the side frame is of composite structure. A rectangular high strength metal pipe is located centrally to serve as a main body of the side frame and a cavity of the rectangular high-strength metal pipe is filled with a filling material. A plurality of non-metal profiles are respectively fixed on an outer surface of the rectangular high-strength metal pipe, and an installation groove for installing glass is formed between the rectangular high strength metal pipe and the non-metal profile. An external profile is a metal alloy material, a wooden material, a plastic material, or a glass material fixed on an outer surface of the non-metal profile. The performances of external windows of buildings, such as heat insulation, heat preservation, energy saving, sound insulation, and wind pressure resistance, is improved.

10 Claims, 4 Drawing Sheets

(51) Int. Cl.
 *E06B 5/11* (2006.01)
 *E06B 5/12* (2006.01)

(56) References Cited

U.S. PATENT DOCUMENTS

| | | | | |
|---|---|---|---|---|
| 3,964,231 A * | 6/1976 | Budich | ...................... | E06B 3/30 52/213 |
| 4,113,905 A * | 9/1978 | Kessler | ............... | E06B 3/66314 156/109 |
| 4,222,213 A * | 9/1980 | Kessler | ............... | E06B 3/66314 428/34 |
| 4,658,553 A * | 4/1987 | Shinagawa | ............ | A47F 3/0434 428/34 |
| 5,260,112 A * | 11/1993 | Grether | ............... | E06B 3/66319 428/192 |
| 5,290,611 A * | 3/1994 | Taylor | ................. | E06B 3/66319 428/137 |
| 5,512,341 A * | 4/1996 | Newby | ............... | E06B 3/66314 428/35.8 |
| 6,202,353 B1 * | 3/2001 | Giacomelli | ........... | E06B 3/2632 49/504 |
| 8,286,396 B2 * | 10/2012 | Brunnhofer | ......... | E06B 3/26303 49/501 |
| 2009/0139165 A1 * | 6/2009 | Prete | ..................... | E06B 3/6604 52/204.593 |
| 2010/0281811 A1 * | 11/2010 | Knapp | ................. | B29C 44/206 52/656.2 |
| 2011/0296771 A1 * | 12/2011 | Miller | ................. | E06B 3/66342 52/171.3 |
| 2014/0265758 A1 * | 9/2014 | Reichert | ............... | A47F 3/0434 312/138.1 |
| 2017/0328119 A1 * | 11/2017 | Kuster | ..................... | E06B 3/66 |

* cited by examiner

ENERGY SAVING SECURITY COMPOSITE WINDOW

CROSS-REFERENCES TO RELATED APPLICATIONS

This application claims priority from China Patent Application Serial Number 201721592267.X, which was filed on Nov. 24, 2017, the entire content of which is herein incorporated as reference.

BACKGROUND OF THE INVENTION

1. Technical Field

The present application present application relates to field of external doors and windows of buildings, and in particular, relates to an energy-saving security composite window.

2. Background Art

At present, aluminum alloy windows and plastic-steel windows are widely used in China. Aluminum alloy profiles that are mainly used by the aluminum alloy windows are hollow aluminum alloy profiles with wall thickness equal to or greater than 1.4 mm. Key fabrication procedures of doors and windows are corner combination and assembly. According to a main process of the corner combination, connections between corners of door and window frames and sashes, and connections between a side frame and a muntin are mostly achieved by riveting, corner brace combination, or screw connection. The connection manner is used for connecting a hollow metal with another hollow metal, which cannot effectively ensure overall performances of doors and windows such as sealing, strength, heat insulation, and sound insulation nor effectively prevent heat conduction between indoors and outdoors to reduce running time of household temperature-controlled appliances, eventually resulting in severe energy waste. Usually, three-cavity or multi-cavity PVC plastic profiles with a wall thickness equal to or greater than 2.2 mm are used for the plastic-steel windows, where one cavity is provided with a reinforced steel liner with a wall thickness being 1.5 mm. The corners of door and window frames, a side frame and a muntin are welded together by hot melting plastic profiles, which achieves only connection of the plastic profiles rather than perform any connection for the reinforced steel liners in the cavity. With this process, the overall strength of the doors and windows is greatly reduced, and the doors and windows are easy to deform, thereby leading to poor anti-wind pressure performance, poor anti-warping performance, poor anti-destruction performance, and shorter service life.

SUMMARY OF THE INVENTION

The present application provides a composite window integrating energy-saving, security, sound insulation, superior anti-wind pressure performance and long service life.

The window based on the present application comprises:

a peripheral side frame and glass installed on the side frame. The side frame is of composite structure comprising:

a high-strength metal pipe located centrally to serve as a main body of the side frame and having a cavity filled with a filling material;

a plurality of non-metal profiles respectively fixed on outer surfaces of the rectangular high-strength metal pipes;

an installation groove for installing glass panes formed between the rectangular high-strength metal pipe and the non-metal profiles; and an external profile, which is a metal alloy profile, a wooden profile, a plastic profile, or a glass fiber profile, fixed on outer surfaces of the non-metal profiles.

Preferably, a muntin is connected between an upper part and a lower part of the side frame. The muntin is also of composite structure. An opening frame is constructed between the muntin and a side part of the frame body. The opening frame is hinged with an opening sash. The sash body side frame of the opening sash is also of composite structure. Respective functional groove mating with an anti-theft lock is formed at a bonding position of the sash body of the opening sash and the opening frame.

In the alternative, an opening frame may also be constructed between parts of the side frame (i.e., upper, bottom, and sides). The opening frame may be hinged with an opening sash comprising a sash body and a side frame both of a composite structure. Respective functional groove mating with an anti-theft lock may be formed at a bonding position of the sash body of the opening sash and the opening frame.

The high-strength metal pipe is preferably rectangular.

The material of the rectangular high-strength metal pipe may be low carbon steel, high carbon steel, or stainless steel. The rectangular high-strength metal pipe may be of a solid structure, a single cavity structure, a double cavity structure, or a multi-cavity structure.

The material of the non-metal profile may be a PVC plastic material or a wooden material. The non-metal profile may be of a solid structure, a single cavity structure, a double cavity structure, or a multi-cavity structure.

The material of the metal alloy profile may be an aluminum alloy, an alloy of aluminum, titanium, and magnesium, an alloy of aluminum, zinc, and magnesium, or stainless steel. The metal alloy profile may be of a solid structure, a single cavity structure, a double cavity structure, or a multi-cavity structure.

The glass may be laminated hollow multi-layer glass. A glass padding block may be placed at a position that is on the bottom of the glass and is in contact with the rectangular high-strength metal pipe.

The filling material may be a polyurethane foam heat insulation material.

The metal alloy profile may be fixed at an angle of 90 degrees or a flat angle or an angle of 45 degrees at a corner of the side frame or at a connection of the side frame and the muntin. The rectangular high-strength metal pipe may be welded at an angle of 90 degrees or a flat angle or an angle of 45 degrees at a corner of the side frame or at the connection of the side frame and the muntin.

The connections of the rectangular high-strength metal pipe and the metal alloy profile at the corner of the side frame may be both straight seam connections, connecting seams of which are perpendicular to each other.

The connections of the rectangular high-strength metal pipe and the metal alloy profile at the connection of the side frame and the muntin may be both straight seam connections, connecting seams of which are perpendicular to each other or paralleled to each other in a staggering way.

The external profile may be fixed solely on an outer surface of the non-metal profiles or both on the outer surface of the non-metal profiles and an outer surface of the metal pipe.

Compared with those reported in the art, the window based on the present invention has the following advantages: excellent anti-theft and security performances; significant sound insulation, heat insulation and heat preservation performances; high anti-impact, anti-warping and anti-destruction strengths; high sound insulation performances and excellent anti-wind pressure performances; energy saving, simple structure, convenient construction, long service life, and improved energy-saving effect of buildings.

DETAILED DESCRIPTION OF PREFERRED EMBODIMENTS OF THE INVENTION

Figure 1:
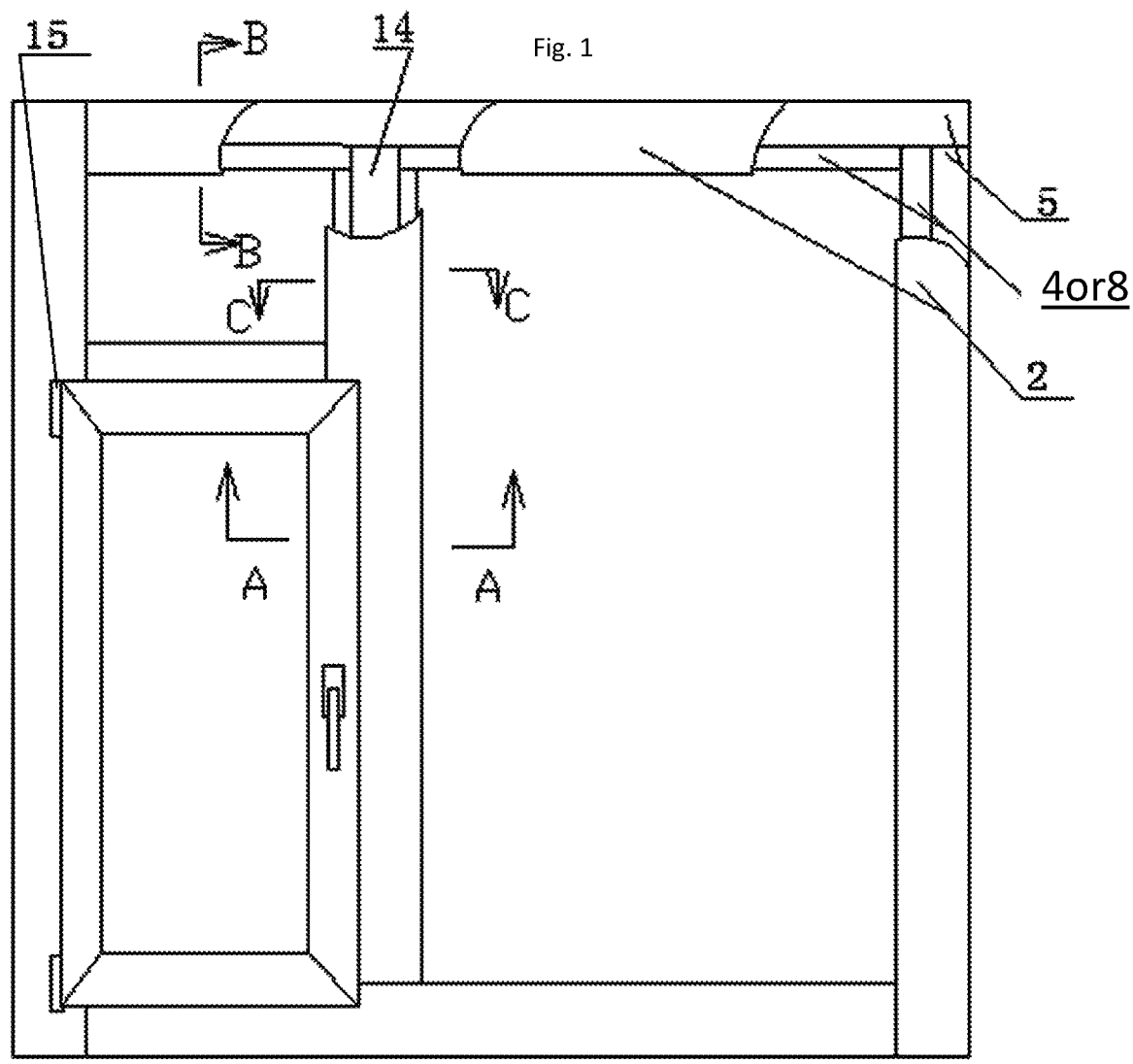
FIG. 1 is a schematic diagram illustrating a structure of the window in accordance with an embodiment of the present invention.
Figure 2:
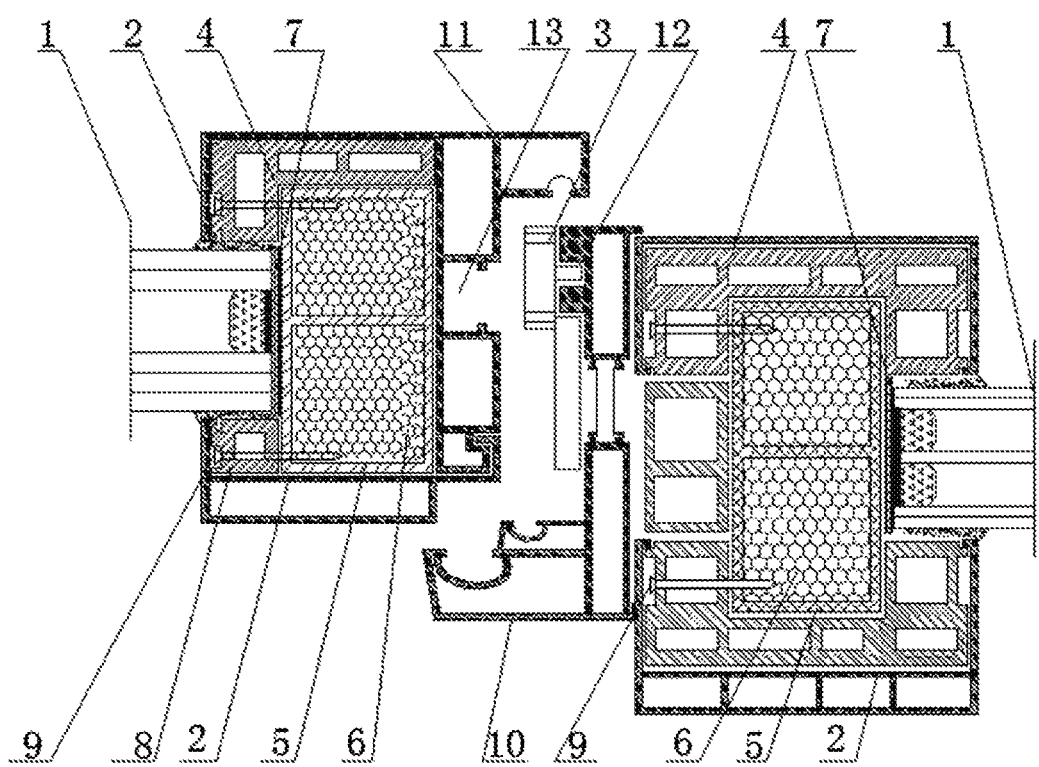
FIG. 2 is an A-A sectional view in FIG. 1.
Figure 3:
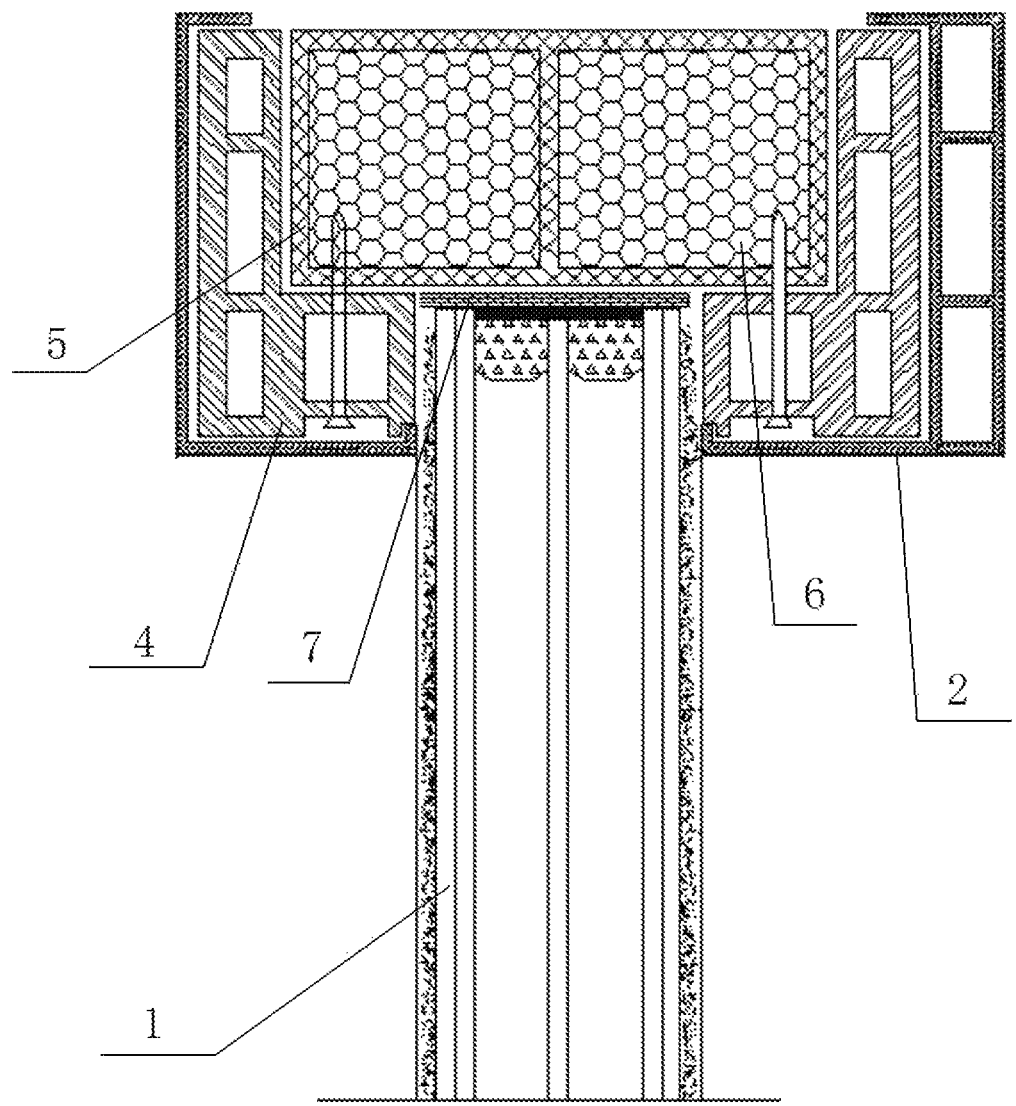
FIG. 3 is a B-B sectional view in FIG. 1.
Figure 4:
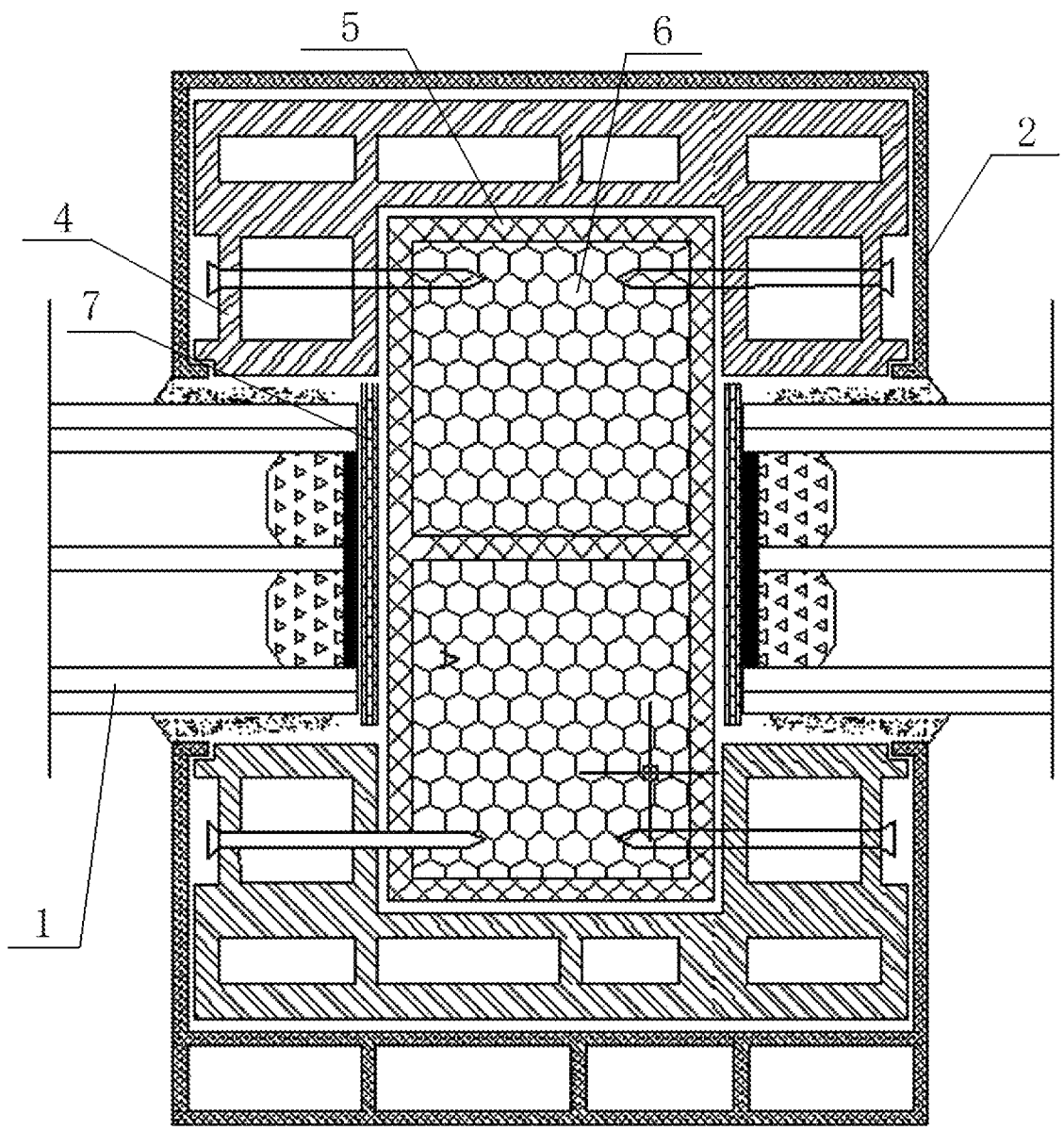
FIG. 4 is a C-C sectional view in FIG. 1.

To facilitate the understanding of those skilled in the art, the present invention will be further described below in conjunction with the accompanying drawings and embodiments, and the contents mentioned in the embodiments are provided to illustrate, but not to limit the present invention.

The reference numerals in the drawings include:
1—laminated hollow multi-layer glass, 2—a metal alloy profile, 3—a multi-fixing point security lock block, 4—a non-metal profile, 5—a rectangular high-strength metal pipe, 6—a polyurethane foam material, 7—a glass padding block, 8—a non-metal profile, 9—a screw, 10—an opening frame, 11—an opening sash, 12—a first functional groove, 13—a second functional groove, 14—a muntin, 15—a hinge.

As shown in FIGS. 1-4, there is provided an energy-saving safe composite window, including a peripheral side frame and laminated hollow multi-layer glass 1 installed on the side frame, where the side frame is of composite structure and includes a rectangular high-strength metal pipe 5, a non-metal profile 4 (8) and a metal alloy profile 2 as follows.

The rectangular high-strength metal pipe 5 is located centrally to serve as a main body of the side frame and the rectangular high-strength metal pipe 5 has an cavity filled with a heat insulation material, for example, a polyurethane foam material 6 in the example; the material of the rectangular high-strength metal pipe 5 is a metal material such as low carbon steel, high carbon steel, or stainless steel; the rectangular high-strength metal pipe 5 is of a solid structure, a single cavity structure, a double cavity structure or a multi-cavity structure. The double cavity structure is adopted in the example.

There are a plurality of the non-metal profiles 4 (8) which are respectively fixed on an outer surface of the rectangular high-strength metal pipe 5 and an installation groove for the laminated hollow multi-layer glass 1 is formed between the rectangular high-strength metal pipe 5 and the non-metal profile 4(8); the non-metal profile 4(8) is a polymer material such as a PVC plastic material and a wooden material; the non-metal profile 4(8) is of a solid structure, a single cavity structure, a double cavity structure or a multi-cavity structure, for example, the non-metal profile 4 is of a multi-cavity structure and the non-metal profile 8 is of a single cavity structure.

The metal alloy profile 2 may be fixed solely on an outer surface of the non-metal profiles 4(8) or both on the outer surface of the non-metal profiles 4(8) and that of the rectangular high-strength metal pipe 5. The multiple non-metal profiles are respectively fixed on the outers surface of the rectangular high-strength metal pipe 5, but maybe not necessarily cover the entire outer surface of the rectangular high-strength metal pipe 5. Therefore, there are two situations of fixing the metal alloy profile 2. For example, FIG. 2, right part, shows the first way of fixing the metal alloy profile 2, i.e., fixing it solely on an outer surface of the non-metal profiles 4(8), and FIG. 2, left part, shows the second way of fixing the metal alloy profile 2, i.e., fixing it both on the outer surface of the non-metal profiles 4(8) and that of the rectangular high-strength metal pipe 5.

The material of the metal alloy profile 2 may be a metal alloy, such as an aluminum alloy, an alloy of aluminum, titanium and magnesium, an alloy of aluminum, zinc and magnesium or stainless steel; the metal alloy profile 2 is of a solid structure, a single cavity structure, a double cavity structure, a multi-cavity structure or a heat insulation break bridge multi-cavity structure; of course, according to actual needs, the metal alloy profile 2 may also be replaced by a wooden profile, a plastic profile or a glass fiber profile.

A muntin 14 is connected between an upper part and a lower part of the side frame. The muntin 14 is also of composite structure, an opening frame 11 is constructed between the muntin 14 and a side part of the frame body and the opening frame 10 is hinged with an opening sash 11 through a hinge 15 and the sash body side frame of the opening sash 11 is also of composite structure; respective functional groove, that is, a first functional groove 12 and a second functional groove 13, mating with an anti-theft lock is formed at a bonding position of the sash body of the opening sash 11 and the opening frame 10.

The metal alloy profile 2 is fixed at an angle of 90 degrees or a flat angle or an angle of 45 degrees at a corner of the side frame or at the connection of the side frame and the muntin; the rectangular high-strength metal pipe 5 is welded at an angle of 90 degrees or a flat angle or an angle of 45 degrees at a corner of the side frame or at the connection of the side frame and the muntin. In order to achieve better stability and better sealing effect, it is preferred that the connections of the rectangular high-strength metal pipe 5 and the metal alloy profile 2 at the corner of the side frame are both straight seam connections (that is, fixed at an angle of 90 degrees), connecting seams of which are perpendicular to each other; the connecting seam of the rectangular high-strength metal pipe 5 in FIG. 1 is in a horizontal direction, and the connecting seam of the metal alloy profile 2 is in a perpendicular direction. The connections of the rectangular high-strength metal pipe 5 and the metal alloy profile 2 at the connection of the side frame and the muntin are both straight seam connections, connecting seams of which are paralleled to each other in a staggering way. The connecting seams of the rectangular high-strength metal pipe 5 and the metal alloy profile 2 in FIG. 1 are both in horizontal direction and paralleled to each other in a staggering way.

The processing procedure of the present application is as follows: processing a non-metal material into the non-metal profile 4 or 8 with a desired size, fixing the non-metal profile 4 or 8 on the rectangular high-strength metal pipe 5 and placing a glass padding block 7 at a position that is on the bottom of the laminated hollow multi-layer glass 1 and is in contact with the rectangular high-strength metal pipe 5 when the laminated hollow multi-layer glass 1 is installed. An opening part mainly includes the opening frame 10 and the opening sash 11. The opening sash 11 is the same as above in material and structure. The functional groove 13 mating with an anti-theft lock is formed at a position that is on the opening sash 11 and is connected to the opening frame 10 and the functional groove 12 mating with the anti-theft lock and installed with a multi-fixing point security lock block 3 is formed at a position that is on the opening frame 10 and is connected to the opening sash 11. The opening sash 11 and the opening frame 10 can form a safe sealing structure with different passes of sealing and different locking positions under the simultaneous action of the hinge 15 and the anti-theft lock.

The present application can improve the performances of external windows of buildings such as heat insulation, heat preservation, energy saving, sound insulation, and wind pressure resistance, so that the external windows of buildings have performances of resisting impact, warping and destruction, thereby increasing anti-aging capability of the external windows and prolonging their service life.

Those skilled in the art may easily understand that the examples described above are merely preferred examples of the present application but are not intended to limit the protection scope of the present application. Any modifications, equivalent substitutions and improvements made within the spirit and principle of the present application shall all fall in the protection scope of the present application.

What is claimed is:

1. An energy-saving security composite window comprising a peripheral side frame and glass installed on the side frame, wherein the side frame is of composite structure comprising:
    a metal pipe located centrally to serve as a main body of the side frame and having an inner cavity filled with a filling material,
    a plurality of non-metal profiles respectively fixed on an outer surface of the metal pipe,
    an installation groove for installing glass formed between the metal pipe and the non-metal profiles; and
    an external profile fixed solely on an outer surface of the non-metal profiles or both on the outer surface of the non-metal profiles and an outer surface of the metal pipe, wherein the external profile is a metal alloy profile, a wooden profile, a plastic profile or a glass fiber profile;
    wherein the glass is laminated hollow multi-layer glass; a glass padding block is placed at a position that is on the bottom of the glass and is in contact with the metal pipe.

2. The window according to claim 1 further comprising a muntin connected between an upper part and a lower part of the side frame, wherein the muntin is also of composite structure, an opening frame is constructed between the muntin and a side part of the frame body, the opening frame is hinged with an opening sash, wherein the opening sash comprises a sash body and sash frame both with a composite structure; respective functional groove mating with an anti-theft lock is formed at a bonding position of the sash body of the opening sash and the opening frame.

3. The window according to claim 1 wherein an opening frame is constructed between parts of the side frame, the opening frame is hinged with an opening sash comprising a sash body and a side frame both of a composite structure; respective functional groove mating with an anti-theft lock is formed at a bonding position of the sash body of the opening sash and the opening frame.

4. The window according to claim 1, wherein the metal pipe is rectangular; the material of the metal pipe is low carbon steel, high carbon steel, or stainless steel; the metal pipe is of a solid structure, a single cavity structure, a double cavity structure, or a multi-cavity structure.

5. The window according to claim 1, wherein the non-metal profile is a PVC plastic material, or a wooden material; the non-metal profile is of a solid structure, a single cavity structure, a double cavity structure, or a multi-cavity structure.

6. The window according to claim 1, wherein the external profile is the metal alloy profile, and the material of the metal alloy profile is an aluminum alloy, an alloy of aluminum, titanium and magnesium, an alloy of aluminum, zinc and magnesium or stainless steel; the metal alloy profile is of a solid structure, a single cavity structure, a double cavity structure, or a multi-cavity structure.

7. The window according to claim 1, wherein the filling material is a polyurethane foam heat insulation material.

8. The window according to claim 1, wherein the external profile is the metal alloy profile, and the metal alloy profile is fixed at an angle of 90 degrees, a flat angle or an angle of 45 degrees at a corner of the side frame or at a connection of the side frame and the muntin; the metal pipe is welded at an angle of 90 degrees, a flat angle, or an angle of 45 degrees at the connection of the side frame and the muntin.

9. The window according to claim 8, wherein the connections of the metal pipe and the metal alloy profile at the corner of the side frame are both straight seam connections, connecting seams of which are perpendicular to each other.

10. The window according to claim 8, wherein the connections of metal pipe and the metal alloy profile at the connection of the side frame and the muntin are both straight seam connections, connecting seams of which are perpendicular to each other or paralleled to each other in a staggering way.

\* \* \* \* \*